(12) United States Patent
Hirai

(10) Patent No.: US 10,942,595 B2
(45) Date of Patent: Mar. 9, 2021

(54) SEMICONDUCTOR DEVICE, CONTROL METHOD THEREOF, AND COUPLING RELATION SETTING PROCESS PROGRAM

(71) Applicant: RENESAS ELECTRONICS CORPORATION, Tokyo (JP)

(72) Inventor: Masato Hirai, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 14 days.

(21) Appl. No.: 16/284,198

(22) Filed: Feb. 25, 2019

(65) Prior Publication Data

US 2019/0302956 A1 Oct. 3, 2019

(30) Foreign Application Priority Data

Mar. 30, 2018 (JP) .............................. JP2018-067237

(51) Int. Cl.
*G06F 3/041* (2006.01)
*G06F 3/044* (2006.01)
*G01D 5/24* (2006.01)

(52) U.S. Cl.
CPC ............. *G06F 3/0416* (2013.01); *G01D 5/24* (2013.01); *G06F 3/044* (2013.01)

(58) Field of Classification Search
CPC ....... G06F 3/041–04897; G06F 3/0416; G06F 3/044; G06F 3/04164; G06F 3/0443; G06F 3/0446; G06F 3/04166; G01D 5/24
See application file for complete search history.

(56) References Cited

U.S. PATENT DOCUMENTS

| 9,046,978 | B2* | 6/2015 | Katsurahira | .......... G06F 3/0418 |
| 2015/0123939 | A1* | 5/2015 | Kim | ........................ G06F 3/044 |
| | | | | 345/174 |
| 2018/0267662 | A1* | 9/2018 | Mei | ........................ G06F 3/044 |

FOREIGN PATENT DOCUMENTS

JP 2013-196675 A 9/2013

* cited by examiner

*Primary Examiner* — Temesghen Ghebretinsae
*Assistant Examiner* — Ivelisse Martinez Quiles
(74) *Attorney, Agent, or Firm* — McDermott Will & Emery LLP

(57) ABSTRACT

A semiconductor device includes: a plurality of first sensors that is arranged at predetermined intervals; a first measurement circuit that measures the added value of two or more first detection signals among those output from all the first sensors and outputs a first measurement result; a second measurement circuit that measures the added value of two or more first detection signals that are different from those measured by the first measurement circuit among the first detection signals and outputs a second measurement result; and an analysis circuit that analyzes the position of a detection target on the basis of the first and second measurement results, wherein the first sensors and the first and second measurement circuits are coupled to each other so that combinations of the first and second measurement results differ from each other depending on the position of the detection target.

18 Claims, 11 Drawing Sheets

FIG. 2

| SENSOR | DETECTION RESULT (INTENSITY) | | | | | | | | | | | | | | | MEASUREMENT RESULT | | | | |
|---|---|---|---|---|---|---|---|---|---|---|---|---|---|---|---|---|---|---|---|---|
| | S1_1 | S1_2 | S1_3 | S1_4 | S1_5 | S1_6 | S1_7 | S1_8 | S1_9 | S1_10 | S1_11 | S1_12 | S1_13 | S1_14 | S1_15 | A1 | A2 | A3 | A4 | A5 |
| DETECTION CIRCUIT COUPLED TO SENSOR | I1_1 | I1_2 | I1_3 | I1_4 | I1_5 | I1_1 | I1_2 | I1_3 | I1_5 | I1_4 | I1_1 | I1_2 | I1_4 | I1_3 | I1_5 | | | | | |
| S1_1 | 3 | 2 | 1 | 0 | 0 | 0 | 0 | 0 | 0 | 0 | 0 | 0 | 0 | 0 | 0 | 3 | 2 | 1 | 0 | 0 |
| S1_2 | 2 | 3 | 2 | 1 | 0 | 0 | 0 | 0 | 0 | 0 | 0 | 0 | 0 | 0 | 0 | 2 | 3 | 2 | 1 | 0 |
| S1_3 | 1 | 2 | 3 | 2 | 1 | 0 | 0 | 0 | 0 | 0 | 0 | 0 | 0 | 0 | 0 | 1 | 2 | 3 | 2 | 1 |
| S1_4 | 0 | 1 | 2 | 3 | 2 | 1 | 0 | 0 | 0 | 0 | 0 | 0 | 0 | 0 | 0 | 1 | 1 | 2 | 3 | 2 |
| S1_5 | 0 | 0 | 1 | 2 | 3 | 2 | 1 | 0 | 0 | 0 | 0 | 0 | 0 | 0 | 0 | 2 | 1 | 1 | 2 | 3 |
| S1_6 | 0 | 0 | 0 | 1 | 2 | 3 | 2 | 1 | 0 | 0 | 0 | 0 | 0 | 0 | 0 | 3 | 2 | 1 | 1 | 2 |
| S1_7 | 0 | 0 | 0 | 0 | 1 | 2 | 3 | 2 | 1 | 0 | 0 | 0 | 0 | 0 | 0 | 2 | 3 | 2 | 1 | 2 |
| S1_8 | 0 | 0 | 0 | 0 | 0 | 1 | 2 | 3 | 2 | 1 | 0 | 0 | 0 | 0 | 0 | 1 | 2 | 3 | 2 | 2 |
| S1_9 | 0 | 0 | 0 | 0 | 0 | 0 | 1 | 2 | 3 | 2 | 1 | 0 | 0 | 0 | 0 | 1 | 1 | 2 | 3 | 2 |
| S1_10 | 0 | 0 | 0 | 0 | 0 | 0 | 0 | 1 | 2 | 3 | 2 | 1 | 0 | 0 | 0 | 2 | 1 | 1 | 2 | 3 |
| S1_11 | 0 | 0 | 0 | 0 | 0 | 0 | 0 | 0 | 1 | 2 | 3 | 2 | 1 | 0 | 0 | 3 | 2 | 0 | 3 | 2 |
| S1_12 | 0 | 0 | 0 | 0 | 0 | 0 | 0 | 0 | 0 | 1 | 2 | 3 | 2 | 1 | 0 | 2 | 3 | 1 | 2 | 1 |
| S1_13 | 0 | 0 | 0 | 0 | 0 | 0 | 0 | 0 | 0 | 0 | 1 | 2 | 3 | 2 | 1 | 1 | 2 | 2 | 3 | 0 |
| S1_14 | 0 | 0 | 0 | 0 | 0 | 0 | 0 | 0 | 0 | 0 | 0 | 1 | 2 | 3 | 2 | 0 | 1 | 3 | 2 | 1 |
| S1_15 | 0 | 0 | 0 | 0 | 0 | 0 | 0 | 0 | 0 | 0 | 0 | 0 | 1 | 2 | 3 | 0 | 0 | 2 | 1 | 2 |

SENSOR ABOVE WHICH DETECTION TARGET IS POSITIONED DIRECTLY

FIG. 4

```python
#!/usr/bin/env python
coding:utf-8 import itertools
```
INTENSITY OF DETECTION SIGNAL
```python
ampl_case = [[[3,2,1,0,0], [0,0,0,0,0], [0,0,0,0,0]],
             [[2,3,2,1,0], [0,0,0,0,0], [0,0,0,0,0]],
             [[1,2,3,2,1], [0,0,0,0,0], [0,0,0,0,0]],
             [[0,1,2,3,2], [1,0,0,0,0], [0,0,0,0,0]],
             [[0,0,1,2,3], [2,1,0,0,0], [0,0,0,0,0]],
             [[0,0,0,1,2], [3,2,1,0,0], [0,0,0,0,0]],
             [[0,0,0,0,1], [2,3,2,1,0], [0,0,0,0,0]],
             [[0,0,0,0,0], [1,2,3,2,1], [0,0,0,0,0]],
             [[0,0,0,0,0], [0,1,2,3,2], [1,0,0,0,0]],
             [[0,0,0,0,0], [0,0,1,2,3], [2,1,0,0,0]],
             [[0,0,0,0,0], [0,0,0,1,2], [3,2,1,0,0]],
             [[0,0,0,0,0], [0,0,0,0,1], [2,3,2,1,0]],
             [[0,0,0,0,0], [0,0,0,0,0], [1,2,3,2,1]],
             [[0,0,0,0,0], [0,0,0,0,0], [0,1,2,3,2]],
             [[0,0,0,0,0], [0,0,0,0,0], [0,0,1,2,3]]]
```
COUPLING DESTINATION OF EACH SENSOR (INITIAL VALUE)
```python
coil_id_org = [[0,1,2,3,4], [0,1,2,3,4], [0,1,2,3,4]]
coil_id_grp0_perm = list(itertools.permutations(coil_id_org[0]))
coil_id_grp1_perm = list(itertools.permutations(coil_id_org[1]))
coil_id_grp2_perm = list(itertools.permutations(coil_id_org[2]))

ampl_grp0 = [0,0,0,0,0]
ampl_grp1 = [0,0,0,0,0]
ampl_grp2 = [0,0,0,0,0]

for coil_id_grp0 in coil_id_grp0_perm:
    for coil_id_grp1 in coil_id_grp1_perm:
        for coil_id_grp2 in coil_id_grp2_perm:
            ampl_add = []

for ampl in ampl_case:
                for i in range(len(ampl[0])):
                    ampl_grp0[i] = ampl[0][coil_id_grp0[i]]
                    ampl_grp1[i] = ampl[1][coil_id_grp1[i]]
                    ampl_grp2[i] = ampl[2][coil_id_grp2[i]]
                ampl_add.append([ampl_grp0[i]+ampl_grp1[i]+ampl_grp2[i] for i in range(len(ampl_grp0))])
            flag_err = 0
            for i in range(len(ampl_add)-1):
                for j in range(i+1, len(ampl_add)):
                    if ampl_add[i] == ampl_add[j]:
                        flag_err = 1
            if flag_err == 0:
                print coil_id_grp0, coil_id_grp1, coil_id_grp2
```

FIG. 5

| COUPLING DESTINATION OF EACH SENSOR | | |
|---|---|---|
| (0, 1, 2, 3, 4) | (0, 1, 2, 4, 3) | (0, 1, 3, 2, 4) |
| (0, 1, 2, 3, 4) | (0, 1, 2, 4, 3) | (0, 1, 3, 4, 2) |
| (0, 1, 2, 3, 4) | (0, 1, 2, 4, 3) | (0, 1, 4, 2, 3) |
| (0, 1, 2, 3, 4) | (0, 1, 2, 4, 3) | (0, 1, 4, 3, 2) |
| (0, 1, 2, 3, 4) | (0, 1, 2, 4, 3) | (0, 2, 1, 3, 4) |
| (0, 1, 2, 3, 4) | (0, 1, 2, 4, 3) | (0, 2, 1, 4, 3) |
| (0, 1, 2, 3, 4) | (0, 1, 2, 4, 3) | (0, 2, 3, 1, 4) |
| (0, 1, 2, 3, 4) | (0, 1, 2, 4, 3) | (0, 2, 3, 4, 1) |
| (0, 1, 2, 3, 4) | (0, 1, 2, 4, 3) | (0, 2, 4, 1, 3) |
| (0, 1, 2, 3, 4) | (0, 1, 2, 4, 3) | (0, 2, 4, 3, 1) |
| (0, 1, 2, 3, 4) | (0, 1, 2, 4, 3) | (0, 3, 1, 2, 4) |
| (0, 1, 2, 3, 4) | (0, 1, 2, 4, 3) | (0, 3, 1, 4, 2) |
| (0, 1, 2, 3, 4) | (0, 1, 2, 4, 3) | (0, 3, 4, 1, 2) |
| (0, 1, 2, 3, 4) | (0, 1, 2, 4, 3) | (0, 3, 4, 2, 1) |
| (0, 1, 2, 3, 4) | (0, 1, 2, 4, 3) | (0, 4, 2, 1, 3) |
| (0, 1, 2, 3, 4) | (0, 1, 2, 4, 3) | (0, 4, 2, 3, 1) |
| (0, 1, 2, 3, 4) | (0, 1, 2, 4, 3) | (1, 0, 2, 3, 4) |
| (0, 1, 2, 3, 4) | (0, 1, 2, 4, 3) | (1, 0, 2, 4, 3) |
| (0, 1, 2, 3, 4) | (0, 1, 2, 4, 3) | (1, 0, 3, 2, 4) |
| (0, 1, 2, 3, 4) | (0, 1, 2, 4, 3) | (1, 0, 4, 2, 3) |
| (0, 1, 2, 3, 4) | (0, 1, 2, 4, 3) | (1, 2, 0, 3, 4) |
| (0, 1, 2, 3, 4) | (0, 1, 2, 4, 3) | (1, 2, 0, 4, 3) |
| (0, 1, 2, 3, 4) | (0, 1, 2, 4, 3) | (1, 2, 3, 0, 4) |
| (0, 1, 2, 3, 4) | (0, 1, 2, 4, 3) | (1, 2, 4, 0, 3) |
| (0, 1, 2, 3, 4) | (0, 1, 2, 4, 3) | (1, 2, 4, 3, 0) |

| SENSOR | DETECTION CIRCUIT COUPLED TO SENSOR | | | | | | | | | | | | | | | MEASUREMENT RESULT | | | | |
|---|---|---|---|---|---|---|---|---|---|---|---|---|---|---|---|---|---|---|---|---|
| | S1_1 | S1_2 | S1_3 | S1_4 | S1_5 | S1_6 | S1_7 | S1_8 | S1_9 | S1_10 | S1_11 | S1_12 | S1_13 | S1_14 | S1_15 | A1 | A2 | A3 | A4 | A5 |
| | I1_1 | I1_2 | I1_3 | I1_4 | I1_5 | I1_1 | I1_2 | I1_3 | I1_4 | I1_5 | I1_1 | I1_2 | I1_3 | I1_4 | I1_5 | | | | | |
| S1_1 | 3 | 2 | 1 | 0 | 0 | 0 | 0 | 0 | 0 | 0 | 0 | 0 | 0 | 0 | 0 | 3 | 2 | 1 | 0 | 0 |
| S1_2 | 2 | 3 | 2 | 1 | 0 | 0 | 0 | 0 | 0 | 0 | 0 | 0 | 0 | 0 | 0 | 2 | 3 | 2 | 1 | 0 |
| S1_3 | 1 | 2 | 3 | 2 | 1 | 0 | 0 | 0 | 0 | 0 | 0 | 0 | 0 | 0 | 0 | 1 | 2 | 3 | 2 | 1 |
| S1_4 | 0 | 1 | 2 | 3 | 2 | 1 | 0 | 0 | 0 | 0 | 0 | 0 | 0 | 0 | 0 | 1 | 1 | 2 | 3 | 2 |
| S1_5 | 0 | 0 | 1 | 2 | 3 | 2 | 1 | 0 | 0 | 0 | 0 | 0 | 0 | 0 | 0 | 2 | 2 | 1 | 2 | 3 |
| S1_6 | 0 | 0 | 0 | 1 | 2 | 3 | 2 | 1 | 0 | 0 | 0 | 0 | 0 | 0 | 0 | 3 | 3 | 2 | 1 | 2 |
| S1_7 | 0 | 0 | 0 | 0 | 1 | 2 | 3 | 2 | 1 | 0 | 0 | 0 | 0 | 0 | 0 | 2 | 2 | 2 | 1 | 1 |
| S1_8 | 0 | 0 | 0 | 0 | 0 | 1 | 2 | 3 | 2 | 1 | 0 | 0 | 0 | 0 | 0 | 1 | 1 | 2 | 2 | 2 |
| S1_9 | 0 | 0 | 0 | 0 | 0 | 0 | 1 | 2 | 3 | 2 | 1 | 0 | 0 | 0 | 0 | 2 | 1 | 1 | 2 | 3 |
| S1_10 | 0 | 0 | 0 | 0 | 0 | 0 | 0 | 1 | 2 | 3 | 2 | 1 | 0 | 0 | 0 | 3 | 2 | 1 | 2 | 2 |
| S1_11 | 0 | 0 | 0 | 0 | 0 | 0 | 0 | 0 | 1 | 2 | 3 | 2 | 1 | 0 | 0 | 2 | 2 | 2 | 1 | 1 |
| S1_12 | 0 | 0 | 0 | 0 | 0 | 0 | 0 | 0 | 0 | 1 | 2 | 3 | 2 | 1 | 0 | 1 | 1 | 1 | 1 | 1 |
| S1_13 | 0 | 0 | 0 | 0 | 0 | 0 | 0 | 0 | 0 | 0 | 1 | 2 | 3 | 2 | 1 | 1 | 2 | 2 | 2 | 2 |
| S1_14 | 0 | 0 | 0 | 0 | 0 | 0 | 0 | 0 | 0 | 0 | 0 | 1 | 2 | 3 | 2 | 0 | 1 | 2 | 3 | 2 |
| S1_15 | 0 | 0 | 0 | 0 | 0 | 0 | 0 | 0 | 0 | 0 | 0 | 0 | 1 | 2 | 3 | 0 | 0 | 1 | 2 | 3 |

SENSOR ABOVE WHICH DETECTION TARGET IS POSITIONED DIRECTLY

DETECTION SIGNAL (INTENSITY)

SEMICONDUCTOR DEVICE, CONTROL METHOD THEREOF, AND COUPLING RELATION SETTING PROCESS PROGRAM

CROSS-REFERENCE TO RELATED APPLICATIONS

The disclosure of Japanese Patent Application No. 2018-067237 filed on Mar. 30, 2018 including the specification, drawings and abstract is incorporated herein by reference in its entirety.

BACKGROUND

The present invention relates to a semiconductor device, a control method thereof, and a coupling relation setting process program, and, for example, a semiconductor device, a control method thereof, and a coupling relation setting process program by which detection time of a detection target can be shortened without increasing the circuit scale.

A detection device (semiconductor device) for detecting the position of a detection target such as a touch pen or a finger used to operate a touch panel is mounted in the touch panel of a smartphone, a tablet terminal, or the like. The detection device has been required to reduce the circuit scale without deteriorating the detection accuracy.

A relevant technique is disclosed in Japanese Unexamined Patent Application Publication No. 2013-196675. A position detection device disclosed in Japanese Unexamined Patent Application Publication No. 2013-196675 includes a plurality of electrodes, a selection circuit that selectively outputs a set of electrodes among the electrodes, and a differential amplification circuit that amplifies a pair of signals received from the set of electrodes selected by the selection circuit. Accordingly, it is not necessary to provide an amplification circuit for each electrode in the position detection device, and thus it is possible to suppress the circuit scale from increasing.

SUMMARY

However, detection time is disadvantageously increased in the configuration of Japanese Unexamined Patent Application Publication No. 2013-196675 because the position of a detection target is detected after all the electrodes are selected. The other problems and novel features will become apparent from the description of the specification and the accompanying drawings.

According to an embodiment, provided is a semiconductor device including: a plurality of first sensors that is arranged at predetermined intervals; a first measurement circuit that measures the added value of two or more first detection signals among those output from all the first sensors and outputs a first measurement result; a second measurement circuit that measures the added value of two or more first detection signals that are different from those measured by the first measurement circuit among the first detection signals and outputs a second measurement result; and an analysis circuit that analyzes the position of a detection target on the basis of the first and second measurement results, wherein the first sensors and the first and second measurement circuits are coupled to each other so that combinations of the first and second measurement results differ from each other depending on the position of the detection target.

According to another embodiment, provided is a control method of a semiconductor device including the steps of: setting coupling relations among a plurality of sensors arranged at predetermined intervals, a first measurement circuit, and a second measurement circuit; detecting a detection target using each of the sensors; measuring the added value of two or more detection signals among those output from all the sensors using the first measurement circuit; measuring the added value of two or more detection signals that are different from those measured by the first measurement circuit among those output from all the sensors using the second measurement circuit; and analyzing the position of the detection target on the basis of a first measurement result by the first measurement circuit and a second measurement result by the second measurement circuit, wherein in the step of setting the coupling relations, the first sensors and the first and second measurement circuits are coupled to each other so that combinations of the first and second measurement results differ from each other depending on the position of the detection target.

According to still another embodiment, in a semiconductor device including: a plurality of sensors that is arranged at predetermined intervals; a first measurement circuit that measures the added value of two or more detection signals among those output from all the sensors and outputs a first measurement result; a second measurement circuit that measures the added value of two or more detection signals that are different from those measured by the first measurement circuit among the detection signals and outputs a second measurement result; and an analysis circuit that analyzes the position of a detection target on the basis of the first and second measurement results, provided is a coupling relation setting process program allowing a computer to execute the processes of: extracting information of a coupling pattern in which the sensors and the first and second measurement circuits are coupled to each other so that combinations of the first and second measurement results differ from each other depending on the position of the detection target; and setting coupling relations among the sensors and the first and second measurement circuits on the basis of the extracted information of the coupling pattern.

According to the embodiment, it is possible to provide a semiconductor device, a control method thereof, and a coupling relation setting process program by which detection time of a detection target can be shortened without increasing the circuit scale.

BRIEF DESCRIPTION OF THE DRAWINGS

FIG. 2 is a diagram for showing relations among the position of a detection target T1 and measurement results A1 to A5 in the semiconductor device according to the first embodiment;

FIG. 4 is a diagram for showing an example of a program description for executing the processes of the flowchart shown in

FIG. 3;

FIG. 5 is a diagram for showing a plurality of candidates of the coupling patterns output by executing the program shown in FIG. 4;

FIG. 11 is a diagram for showing relations among the position of the detection target T1 and the measurement results A1 to A5 in the semiconductor device according to an idea before leading to the first embodiment.

DETAILED DESCRIPTION

Figure 1:
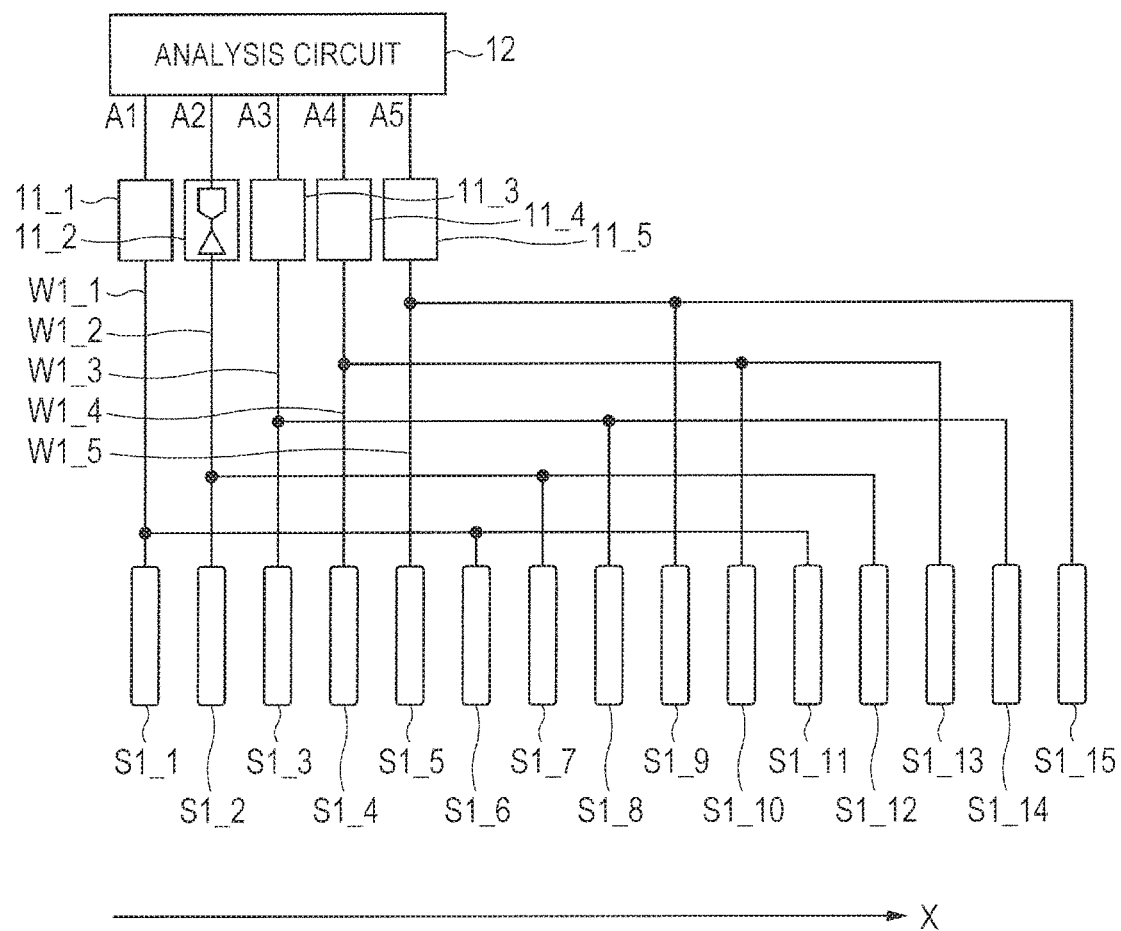
FIG. 1 is a block diagram for showing a configuration example of a semiconductor device according to a first embodiment.

In order to clarify the explanation, the following description and drawings are appropriately omitted and simplified. In addition, each element illustrated in the drawings as a functional block for performing various processes can be configured using a CPU (Central Processing Unit), a memory, or other circuits as hardware, and can be realized by a program or the like loaded to a memory as software. Thus, a person skilled in the art can understand that these functional blocks can be realized in various forms such as only hardware, only software, or a combination thereof, and are not limited to any one of these. It should be noted that the same elements are followed by the same signs in each drawing, and the duplicated explanation thereof is appropriately omitted.

Further, the above-described program can be stored and supplied to a computer using various types of non-transitory computer readable media. The non-transitory computer readable media include various types of tangible recording media. Examples of the non-transitory computer readable media include a magnetic recording medium (for example, a flexible disk, a magnetic tape, or a hard disk drive), a magneto-optical recording medium (for example, a magneto-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, or a RAM (Random Access Memory)). Further, the program may be supplied to a computer by various types of transitory computer readable media. Examples of the transitory computer readable media include an electrical signal, an optical signal, and an electromagnetic wave. The program can be supplied to a computer by the transitory computer readable media via a wired communication path such as a wire or an optical fiber, or a wireless communication path.

<Previous Consideration by Inventors>

Before describing a semiconductor device 1 according to a first embodiment, a semiconductor device 50 previously considered by the inventors will be described.

Figure 10:
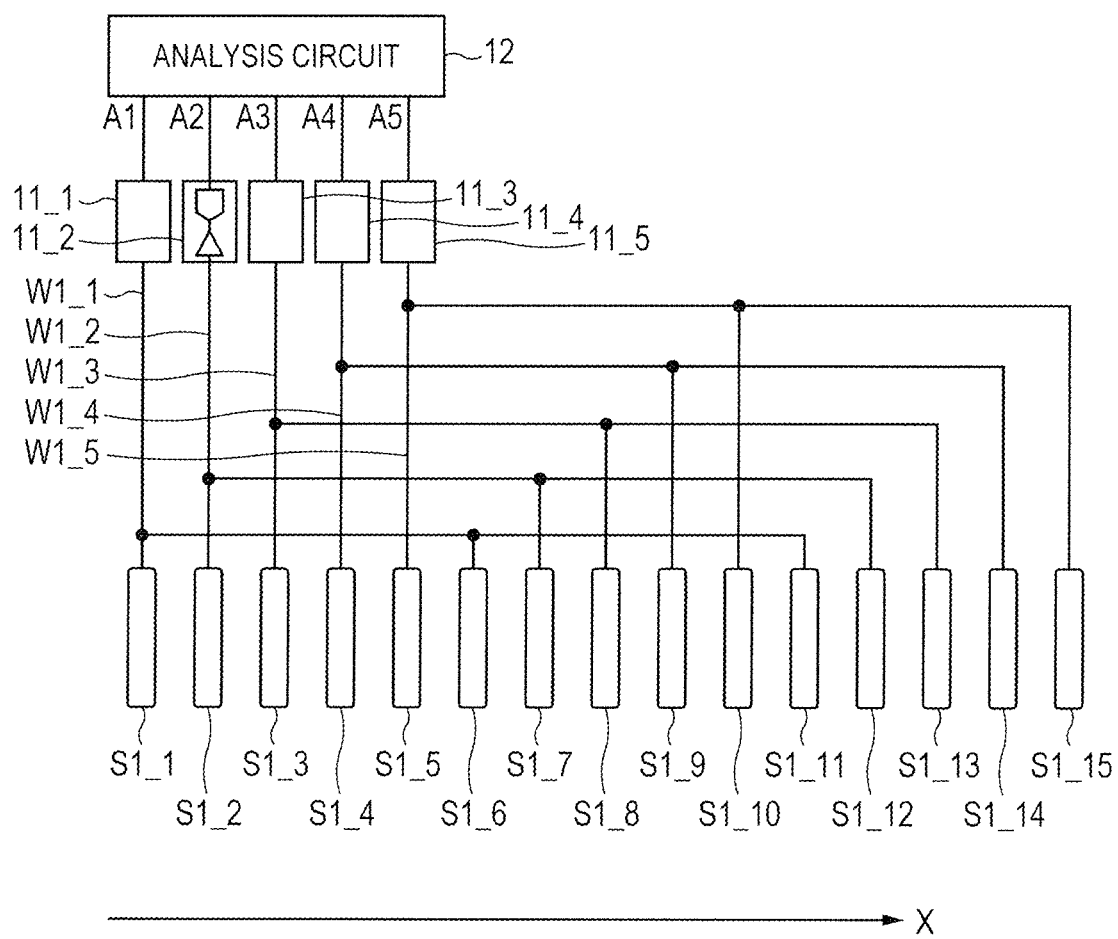
FIG. 10 is a block diagram for showing a configuration example of a semiconductor device according to an idea before leading to the first embodiment.

FIG. 10 is a block diagram for showing a configuration of the semiconductor device 50 according to an idea before leading to the first embodiment. The semiconductor device 50 is a detection device that is mounted in a touch panel of a smartphone, a tablet terminal, or the like, and detects the position of a detection target T1 such as a touch pen or a finger used to operate the touch panel.

As shown in FIG. 10, the semiconductor device 50 includes sensors S1_1 to S1_15, measurement circuits 11_1 to 11_5, wires W1_1 to W1_5, and an analysis circuit 12.

The sensors S1_1 to S1_15 are electrostatic capacitance-type sensors that change the value of an electrostatic capacitance when the detection target T1 comes close thereto, and output a detection signal having intensity in accordance with a distance up to the detection target T1.

Here, the sensors S1_1 to S1_15 are arranged at predetermined intervals in the X-axis direction (for example, the row direction). Namely, the semiconductor device 50 detects the position of the detection target T1 in the X-axis direction using the sensors S1_1 to S1_15.

In the example, a case in which the common detection target T1 is detected by up to five sensors will be described. For example, the detection signal having the strongest intensity is output by the closest sensor to the detection target T1, the detection signal having the second strongest intensity is output by the second closest two sensors (two sensors adjacent to the closest sensor to the detection target T1) to the detection target T1, and the detection signal having the third strongest intensity is output by the third closest two sensors to the detection target T1. No detection signals are output by the other remaining sensors (in other words, 0-level detection signals are output by the other remaining sensors).

In addition, one sensor group is configured using the continuously-arranged five sensors in the example. Specifically, one sensor group is configured using the five sensors S1_1 to S1_5, one sensor group is configured using the five sensors S1_6 to S1_10, and one sensor group is configured using the five sensors S1_11 to S1_15.

The sensors S1_1 to S1_5 are coupled to the wires W1_1 to W1_5, respectively. The sensors S1_6 to S1_10 are coupled to the wires W1_1 to W1_5, respectively. The sensors S1_11 to S1_15 are coupled to the wires W1_1 to W1_5, respectively. Namely, the first sensor of each of the three sensor groups is coupled to the common wire W1_1, the second sensor of each of the three sensor groups is coupled to the common wire W1_2, and the third sensor of each of the three sensor groups is coupled to the common wire W1_3, the fourth sensor of each of the three sensor groups is coupled to the common wire W1_4, and the fifth sensor of each of the three sensor groups is coupled to the common wire W1_5.

The measurement circuit 11_1 measures the added value of the detection signals of the sensors S1_1, S1_6, and S1_11 supplied to the wire W1_1, and outputs a measurement result A1. The measurement circuit 11_2 measures the added value of the detection signals of the sensors S1_2, S1_7, and S1_12 supplied to the wire W1_2, and outputs a measurement result A2. The measurement circuit 11_3 measures the added value of the detection signals of the sensors S1_3, S1_8, and S1_13 supplied to the wire W1_3, and outputs a measurement result A3. The measurement circuit 11_4 measures the added value of the detection signals of the sensors S1_4, S1_9, and S1_14 supplied to the wire W1_4, and outputs a measurement result A4. The measurement circuit 11_5 measures the added value of the detection signals of the sensors S1_5, S1_10, and S1_15 supplied to the wire W1_5, and outputs a measurement result A5. Each of the measurement circuits 11_1 to 11_5 is configured using, for example, an amplification circuit or an AD converter.

It should be noted that the detection signal having the strongest intensity is represented as a value "3", the detection signal having the second strongest intensity is represented as a value "2", and the detection signal having the third strongest intensity is represented as a value "1" in the example. In addition, the other detection signals are represented as a value "0".

Thus, for example, in the case where the value of the detection signal of the sensor S1_1 is "0", the value of the detection signal of the sensor S1_6 is "2", and the value of the detection signal of the sensor S1_11 is "0", the measurement circuit 11_1 outputs the added value "2" as the measurement result A1.

The analysis circuit 12 is, for example, a microcomputer, and analyzes the position of the detection target T1 in the X-axis direction on the basis of a combination of the measurement results A1 to A5 by the measurement circuits 11_1 to 11_5.

FIG. 11 is a diagram for showing relations among the position of the detection target T1 and the measurement results A1 to A5. It should be noted that FIG. 11 also shows a relation between the position of the detection target T1 and the detection result by each of the sensors S1_1 to S1_15.

As shown in FIG. 11, for example, in the case where the detection target T1 is positioned directly above the sensor S1_6, the value of the detection signal of the sensor S1_6 is "3", the value of the detection signal of each of the sensors S1_5 and S1_7 is "2", the value of the detection signal of each of the sensors S1_4 and S1_8 is "1", and the value of the detection signal of each of the other sensors is "0".

At this time, the measurement result A1 is "3" that is the result obtained by adding the detection results "0, 3, 0" by the sensors S1_1, S1_6, and S1_11. The measurement result A2 is "2" that is the result obtained by adding the detection results "0, 2, 0" by the sensors S1_2, S1_7, and S1_12. The measurement result A3 is "1" that is the result obtained by adding the detection results "0, 1, 0" by the sensors S1_3, S1_8, and S1_13. The measurement result A4 is "1" that is the result obtained by adding the detection results "1, 0, 0" by the sensors S1_4, S1_9, and S1_14. The measurement result A5 is "2" that is the result obtained by adding the detection results "2, 0, 0" by the sensors S1_5, S1_10, and S1_15. Namely, a combination of the measurement results A1 to A5 is "3, 2, 1, 1, 2".

On the basis of the combination "3, 2, 1, 1, 2" of the measurement results A1 to A5, the analysis circuit 12 can determine that there is a high possibility that the detection target T1 is positioned directly above the sensor S1_6.

Namely, by using the measurement circuits 11_1 to 11_5 the number of which is small, the semiconductor device 50 can specify the candidate of the position of the detection target T1 in a short time without increasing the circuit scale.

However, in the configuration of the semiconductor device 50, a combination of the measurement results A1 to A5 in the case where the detection target T1 is positioned directly above the sensor S1_11 becomes the same as that of the measurement results A1 to A5 in the case where the detection target T1 is positioned directly above the sensor S1_6.

Specifically, in the case where the detection target T1 is positioned directly above the sensor S1_11, the value of the detection signal of the sensor S1_11 is "3", the value of the detection signal of each of the sensors S1_10 and S1_12 is "2", the value of the detection signal of each of the sensors S1_9 and S1_13 is "1", and the value of the detection signal of each of the other sensors is "0".

At this time, the measurement result A1 is "3" that is the result obtained by adding the detection results "0, 0, 3" by the sensors S1_1, S1_6, and S1_11. The measurement result A2 is "2" that is the result obtained by adding the detection results "0, 0, 2" by the sensors S1_2, S1_7, and S1_12. The measurement result A3 is "1" that is the result obtained by adding the detection results "0, 0, 1" by the sensors S1_3, S1_8, and S1_13. The measurement result A4 is "1" that is the result obtained by adding the detection results "0, 1, 0" by the sensors S1_4, S1_9, and S1_14. The measurement result A5 is "2" that is the result obtained by adding the detection results "0, 2, 0" by the sensors S1_5, S1_10, and S1_15. Namely, a combination of the measurement results A1 to A5 is "3, 2, 1, 1, 2".

Therefore, there has been a problem that the analysis circuit 12 cannot specify whether the detection target T1 is positioned directly above the sensor S1_6 or the sensor S1_11 on the basis of the combination of "3, 2, 1, 1, 2" of the measurement results A1 to A5.

Accordingly, the inventors have found the semiconductor device 1 according to the first embodiment that can accurately specify the position of the detection target T1 in a short time without increasing the circuit scale by devising the coupling relations among the sensors S1_1 to S1_15 and the measurement circuits 11_1 to 11_5.

First Embodiment

FIG. 1 is a block diagram for showing a configuration example of the semiconductor device 1 according to the first embodiment. The semiconductor device 1 according to the embodiment is a detection device that is mounted in a touch panel of a smartphone, a tablet terminal, or the like, and detects the position of a detection target T1 such as a touch pen or a finger used to operate the touch panel.

As shown in FIG. 1, the semiconductor device 1 includes sensors S1_1 to S1_15, measurement circuits 11_1 to 11_5, wires W1_1 to W1_5, and an analysis circuit 12.

The sensors S1_1 to S1_15 are electrostatic capacitance-type sensors that change the value of an electrostatic capacitance when the detection target T1 comes close thereto, and output a detection signal having intensity in accordance with a distance up to the detection target T1. It should be noted that the sensors S1_1 to S1_15 are not limited to electrostatic capacitance-type sensors, but may be sensors that output detection signals having intensity in accordance with the intensity of light or piezoelectric sensors that output detection signals having intensity in accordance with applied pressures.

The sensors S1_1 to S1_15 are arranged at predetermined intervals in the X-axis direction (for example, the row direction). Namely, the semiconductor device 1 detects the position of the detection target T1 in the X-axis direction using the sensors S1_1 to S1_15.

In the embodiment, a case in which the common detection target T1 is detected by up to five sensors will be described. For example, the detection signal having the strongest intensity is output by the closest sensor to the detection target T1, the detection signal having the second strongest intensity is output by the second closest two sensors (two sensors adjacent to the closest sensor to the detection target T1) to the detection target T1, and the detection signal having the third strongest intensity is output by the third closest two sensors to the detection target T1. No detection signals are output by the other remaining sensors (in other words, 0-level detection signals are output by the other remaining sensors).

In addition, a case in which one sensor group is configured using the continuously-arranged five sensors will be exemplified in the embodiment. Specifically, one sensor group is configured using the five sensors S1_1 to S1_5, one sensor group is configured using the five sensors S1_6 to S1_10, and one sensor group is configured using the five sensors S1_11 to S1_15.

As an example, the sensors S1_1 to S1_5 are coupled to the wires W1_1 to W1_5, respectively. The sensors S1_6 to S1_10 are coupled to the wires W1_1, W1_2, W1_3, W1_5, and W1_4, respectively. In addition, the sensors S1_11 to S1_15 are coupled to the wires W1_1, W1_2, W1_4, W1_3, and W1_5, respectively.

The measurement circuit 11_1 measures the added value of the detection signals of the sensors S1_1, S1_6, and S1_11 supplied to the wire W1_1, and outputs a measurement result A1. The measurement circuit 11_2 measures the added value of the detection signals of the sensors S1_2, S1_7, and S1_12 supplied to the wire W1_2, and outputs a measurement result A2. The measurement circuit 11_3 measures the added value of the detection signals of the sensors S1_3, S1_8, and S1_14 supplied to the wire W1_3, and outputs a measurement result A3. The measurement circuit 11_4 measures the added value of the detection signals of the sensors S1_4, S1_10, and S1_13 supplied to the wire W1_4, and outputs a measurement result A4. The measurement circuit 11_5 measures the added value of the detection signals of the sensors S1_5, S1_9, and S1_15 supplied to the wire W1_5, and outputs a measurement result A5.

Each of the measurement circuits 11_1 to 11_5 is configured using, for example, an amplification circuit or an AD converter. Here, all the measurement circuits 11_1 to 11_5 are configured to ideally perform the same operation. Specifically, the amplification circuit provided in each of the measurement circuits 11_1 to 11_5 is configured to ideally amplify the detection signal at the same amplification factor, and the AD converter provided in each of the measurement circuits 11_1 to 11_5 is configured to ideally AD-convert at the same resolution.

It should be noted that the detection signal having the strongest intensity is represented as a value "3", the detection signal having the second strongest intensity is represented as a value "2", and the detection signal having the third strongest intensity is represented as a value "1" in the example. In addition, the other detection signals are represented as a value "0".

Thus, for example, in the case where the value of the detection signal of the sensor S1_1 is "0", the value of the detection signal of the sensor S1_6 is "2", and the value of the detection signal of the sensor S1_11 is "0", the measurement circuit 11_1 outputs the added value "2" as the measurement result A1.

The analysis circuit 12 is, for example, a microcomputer, and analyzes the position of the detection target T1 in the X-axis direction on the basis of a combination of the measurement results A1 to A5 by the measurement circuits 11_1 to 11_5.

FIG. 2 is a diagram for showing relations among the position of the detection target T1 and the measurement results A1 to A5. It should be noted that FIG. 2 also shows a relation between the position of the detection target T1 and the detection result by each of the sensors S1_1 to S1_15.

As shown in FIG. 2, for example, in the case where the detection target T1 is positioned directly above the sensor S1_6, the value of the detection signal of the sensor S1_6 is "3", the value of the detection signal of each of the sensors S1_5 and S1_7 is "2", the value of the detection signal of each of the sensors S1_4 and S1_8 is "1", and the value of the detection signal of each of the other sensors is "0".

At this time, the measurement result A1 is "3" that is the result obtained by adding the detection results "0, 3, 0" by the sensors S1_1, S1_6, and S1_11. The measurement result A2 is "2" that is the result obtained by adding the detection results "0, 2, 0" by the sensors S1_2, S1_7, and S1_12. The measurement result A3 is "1" that is the result obtained by adding the detection results "0, 1, 0" by the sensors S1_3, S1_8, and S1_14. The measurement result A4 is "1" that is the result obtained by adding the detection results "1, 0, 0" by the sensors S1_4, S1_10, and S1_13. The measurement result A5 is "2" that is the result obtained by adding the detection results "2, 0, 0" by the sensors S1_5, S1_9, and S1_15. Namely, a combination of the measurement results A1 to A5 is "3, 2, 1, 1, 2".

On the contrary, in the case where the detection target T1 is positioned directly above the sensor S1_11, the value of the detection signal of the sensor S1_11 is "3", the value of the detection signal of each of the sensors S1_10 and S1_12 is "2", the value of the detection signal of each of the sensors S1_9 and S1_13 is "1", and the value of the detection signal of each of the other sensors is "0".

At this time, the measurement result A1 is "3" that is the result obtained by adding the detection results "0, 0, 3" by the sensors S1_1, S1_6, and S1_11. The measurement result A2 is "2" that is the result obtained by adding the detection results "0, 0, 2" by the sensors S1_2, S1_7, and S1_12. The measurement result A3 is "0" that is the result obtained by adding the detection results "0, 0, 0" by the sensors S1_3, S1_8, and S1_14. The measurement result A4 is "3" that is the result obtained by adding the detection results "0, 2, 1" by the sensors S1_4, S1_10, and S1_13. The measurement result A5 is "1" that is the result obtained by adding the detection results "0, 1, 0" by the sensors S1_5, S1_9, and S1_15. Namely, a combination of the measurement results A1 to A5 is "3, 2, 0, 3, 1".

As described above, unlike the case of the semiconductor device 50, for example, the combination of the measurement results A1 to A5 in the case where the detection target T1 is positioned directly above the sensor S1_6 is different from that in the case where the detection target T1 is positioned directly above the sensor S1_11 in the configuration of the semiconductor device 1. All the combinations, including the above, of the measurement results A1 to A5 in accordance with the position of the detection target T1 are different from each other. Namely, the coupling relations among the sensors S1_1 to S1_15 and the measurement circuits 11_1 to 11_5 are set in the semiconductor device 1 so that all the combinations of the measurement results A1 to A5 in accordance with the position of the detection target T1 are different from each other. Accordingly, the semiconductor device 1 can accurately detect the position of the detection target T1 in a short time without increasing the circuit scale. In addition, an increase in power consumption can be accordingly suppressed.

In addition, in the case where the sensors S1_1 to S1_15 are provided outside a chip of the semiconductor device 1, it is only necessary to couple the sensors S1_1 to S1_15 and the measurement circuits 11_1 to 11_5 to each other through five lines. Thus, the number of external coupling terminals provided on the chip can be reduced.

(Setting Method of Coupling Relation)

Next, a setting method of the coupling relations among the sensors S1_1 to S1_15 and the measurement circuits 11_1 to 11_5 will be described.

Figure 3:
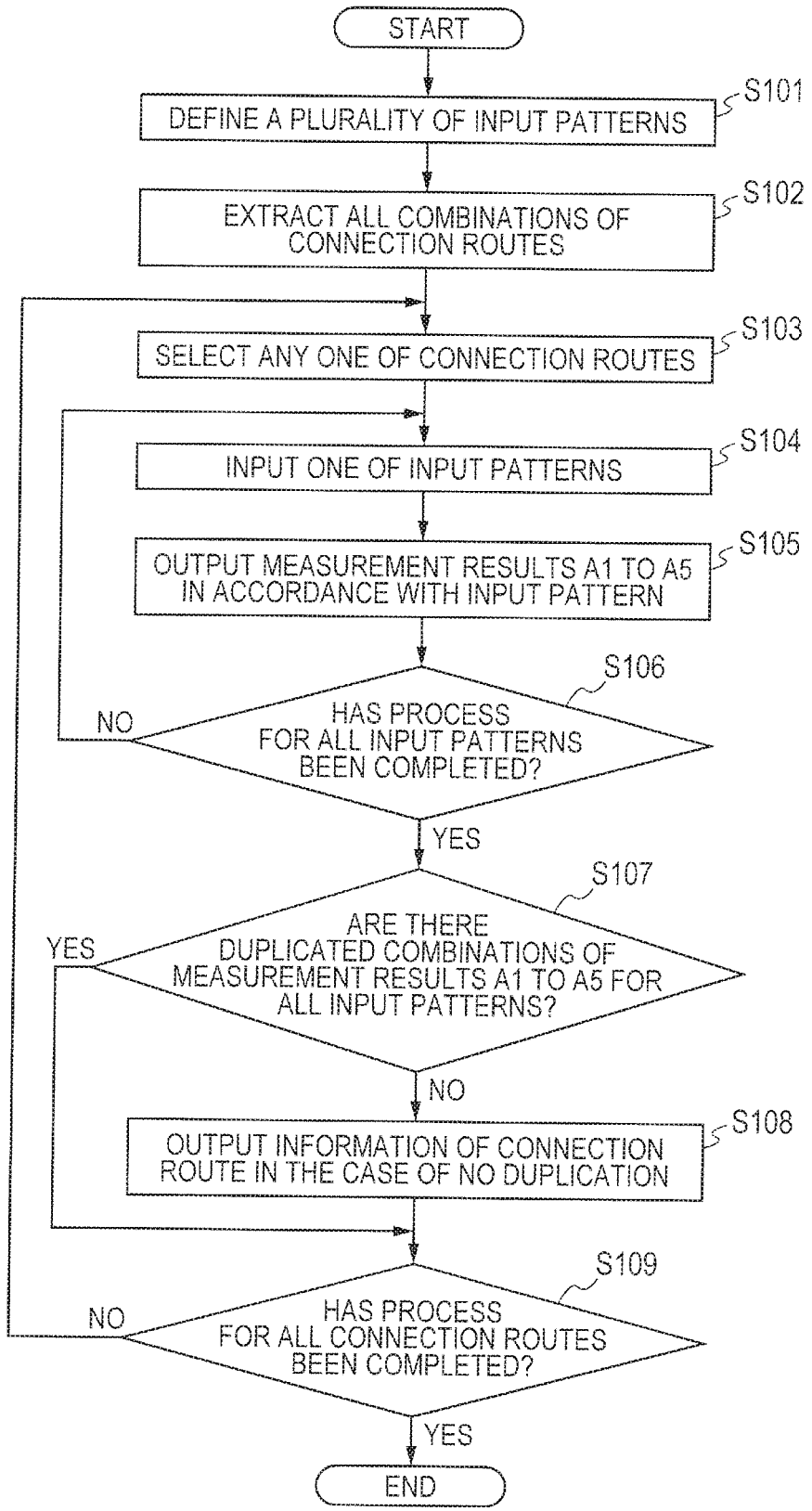
FIG. 3 is a flowchart for showing a setting operation of coupling relations in the semiconductor device shown in FIG. 1.

FIG. 3 is a flowchart for showing a setting method of the coupling relations among the sensors S1_1 to S1_15 and the measurement circuits 11_1 to 11_5. It should be noted that the coupling relations among the sensors S1_1 to S1_15 and the measurement circuits 11_1 to 11_5 are set by, for example, a control circuit (that is not shown in the drawing, but corresponds to a coupling relation setting processor 13 to be described later) at the time of initial setting before the normal operation.

As shown in FIG. 3, a plurality of input patterns (the detection results by the sensors S1_1 to S1_15) in accordance with the position of the detection target T1 is first defined (Step S101).

For example, the input pattern in the case where the detection target T1 is positioned directly above the sensor S1_1 is defined as "3, 2, 1, 0, 0, 0, 0, 0, 0, 0, 0, 0". The input pattern in the case where the detection target T1 is positioned directly above the sensor S1_2 is defined as "2, 3, 2, 1, 0, 0, 0, 0, 0, 0, 0, 0". By defining as described above, the input patterns (16 input patterns in the example) from a case in which the detection target T1 is positioned directly above the sensor S1_1 to a case in which the detection target T1 is positioned directly above the sensor S1_15 are defined. It should be noted that the detail of each input pattern is shown in FIG. 2.

Thereafter, all the coupling patterns (connection routes) among the sensors S1_1 to S1_15 and the measurement circuits 11_1 to 11_5 are extracted (Step S102). However, five sensors belonging to a common sensor group are coupled to the measurement circuits that are different from each other.

Thereafter, one of the extracted coupling patterns is selected (Step S103). In addition, one of the input patterns is selected (Step S104). Then, the measurement results A1 to A5 corresponding to the input patterns (the detection results by the sensors S1_1 to S1_15) being selected in the case where the sensors S1_1 to S1_15 and the measurement circuits 11_1 to 11_5 are coupled to each other using the coupling patterns being selected are calculated (Step S105).

In the case where calculation of all the measurement results A1 to A5 for all the input patterns has not been completed (NO in Step S106), the input pattern that has not been selected yet is selected (Step S104). Then, the measurement results A1 to A5 corresponding to the input patterns (the detection results by the sensors S1_1 to S1_15) being selected in the case where the sensors S1_1 to S1_15 and the measurement circuits 11_1 to 11_5 are coupled to each other using the coupling patterns being selected are calculated (Step S105).

In the case where all the measurement results A1 to A5 for all the input patterns have been calculated (YES in Step S106), it is next determined whether or not duplicated combinations are present among those of the measurement results A1 to A5 (Step S107).

For example, in the case where duplicated combinations are present among those of the measurement results A1 to A5 (YES in Step S107), it is determined that the coupling pattern being selected is not suitable for the semiconductor device 1.

On the contrary, in the case where duplicated combinations are not present among those of the measurement results A1 to A5 (NO in Step S107), information of the coupling pattern being selected is output as information of the coupling pattern that is applicable to the semiconductor device 1 (Step S108).

Thereafter, it is determined whether or not selection of all the coupling patterns has been completed (Step S109). In the case where selection of all the coupling patterns has not been completed (NO in Step S109), the coupling pattern that has not been selected yet is selected (Step S103). Thereafter, the processes of Steps S104 to S109 are executed. Then, when selection of all the coupling patterns has been completed (YES in Step S109), the extraction of the candidates of the coupling patterns is finished. Here, the coupling relations among the sensors S1_1 to S1_15 and the measurement circuits 11_1 to 11_5 are set on the basis of the information of any one of the coupling patterns output from, for example, a control circuit (that is not shown in the drawing, but corresponds to the coupling relation setting processor 13).

FIG. 4 shows an example of a program description for executing the processes of the flowchart shown in FIG. 3. In addition, FIG. 5 shows a plurality of candidates of the coupling patterns output by executing the program shown in FIG. 4. It should be noted that one coupling destination candidate of each of the sensors S1_1 to S1_15 is shown in each row of FIG. 5, and the values "0", "1", "2", "3", and "4" in FIG. 5 mean the measurement circuits 11_1, 11_2, 11_3, 11_4, and 11_5, respectively.

As shown in FIG. 5, in the case where there is a plurality of coupling patterns in which duplicated combinations are not present among those of the measurement results A1 to A5, the coupling relations among the sensors S1_1 to S1_15 and the measurement circuits 11_1 to 11_5 can be set on the basis of an arbitrary coupling pattern among the coupling patterns. Here, it is preferable to select a coupling pattern in which a difference between the measurement results in each combination of the measurement results A1 to A5 becomes as large as possible among the coupling patterns. Accordingly, it is possible to prevent the measurement results A1 to A5 from being unintentionally changed by external noise and the like.

A case in which the semiconductor device 1 includes 15 sensors has been described in the embodiment, but the present invention is not limited to this. The semiconductor device 1 can be appropriately changed to a configuration in which the sensors the arbitrary number of which is larger than that of the measurement circuits are provided.

In addition, a case in which the common detection target T1 is detected by up to five sensors has been described in the embodiment, but the present invention is not limited to this. The common detection target T1 may be detected by an arbitrary number of sensors. For example, the common detection target T1 may be detected by up to three or seven sensors.

In addition, a case in which the semiconductor device 1 includes five measurement circuits has been described as an example in the embodiment, but the present invention is not limited to this. The semiconductor device 1 can be appropriately changed to a configuration in which an arbitrary number (two or more) of measurement circuits are provided. It should be noted that the number of sensors belonging to a common sensor group is the same as that of measurement circuits.

Further, a case in which the detection signal having the strongest intensity is represented as the value "3", the detection signal having the second strongest intensity is represented as the value "2", the detection signal having the third strongest intensity is represented as the value "1" and the other detection signals are represented as the value "0" has been described as an example in the embodiment, but the present invention is not limited to this. An arbitrary value may be set in accordance with the intensity of the detection signal.

(Hardware Configuration of Coupling Relation Setting Processor 13)

It should be noted that the coupling relation setting processor 13 used in the semiconductor device 1 can be realized using, for example, a general computer system.

Hereinafter, the coupling relation setting processor 13 will be briefly described using FIG. 6.

Figure 6:
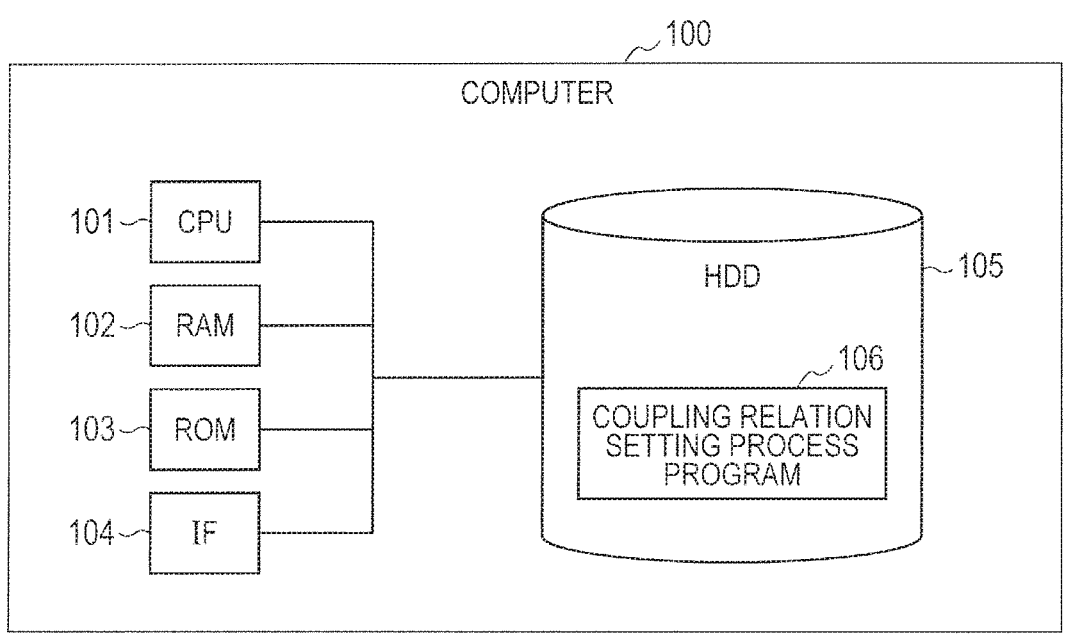
FIG. 6 is a block diagram for showing an example of a hardware configuration of a coupling relation setting processor.

FIG. 6 is a block diagram for showing an example of a hardware configuration of the coupling relation setting processor 13. A computer 100 includes, for example, a CPU (Central Processing Unit) 101 that is a control device, a RAM (Random Access Memory) 102, a ROM (Read Only Memory) 103, an IF (Inter Face) 104 that is an interface with the outside, and an HDD (Hard Disk Drive) 105 that is an example of a non-volatile storage device. Further, the computer 100 may include, as the other configurations (not shown), an input device such as a keyboard or a mouse and a display device such as a display.

The HDD 105 stores an OS (Operating System) (not shown) and a coupling relation setting process program 106. The coupling relation setting process program 106 is a computer program in which a coupling relation setting process according to the embodiment is implemented.

The CPU 101 controls various processes in the computer 100 and access to the RAM 102, the ROM 103, the IF 104, and the HDD 105. The computer 100 allows the CPU 101 to read and execute the OS and the coupling relation setting process program 106 stored in the HDD 105. Accordingly, the computer 100 realizes the coupling relation setting processor 13 according to the embodiment.

(Application Example of Semiconductor Device 1)

Figure 7:
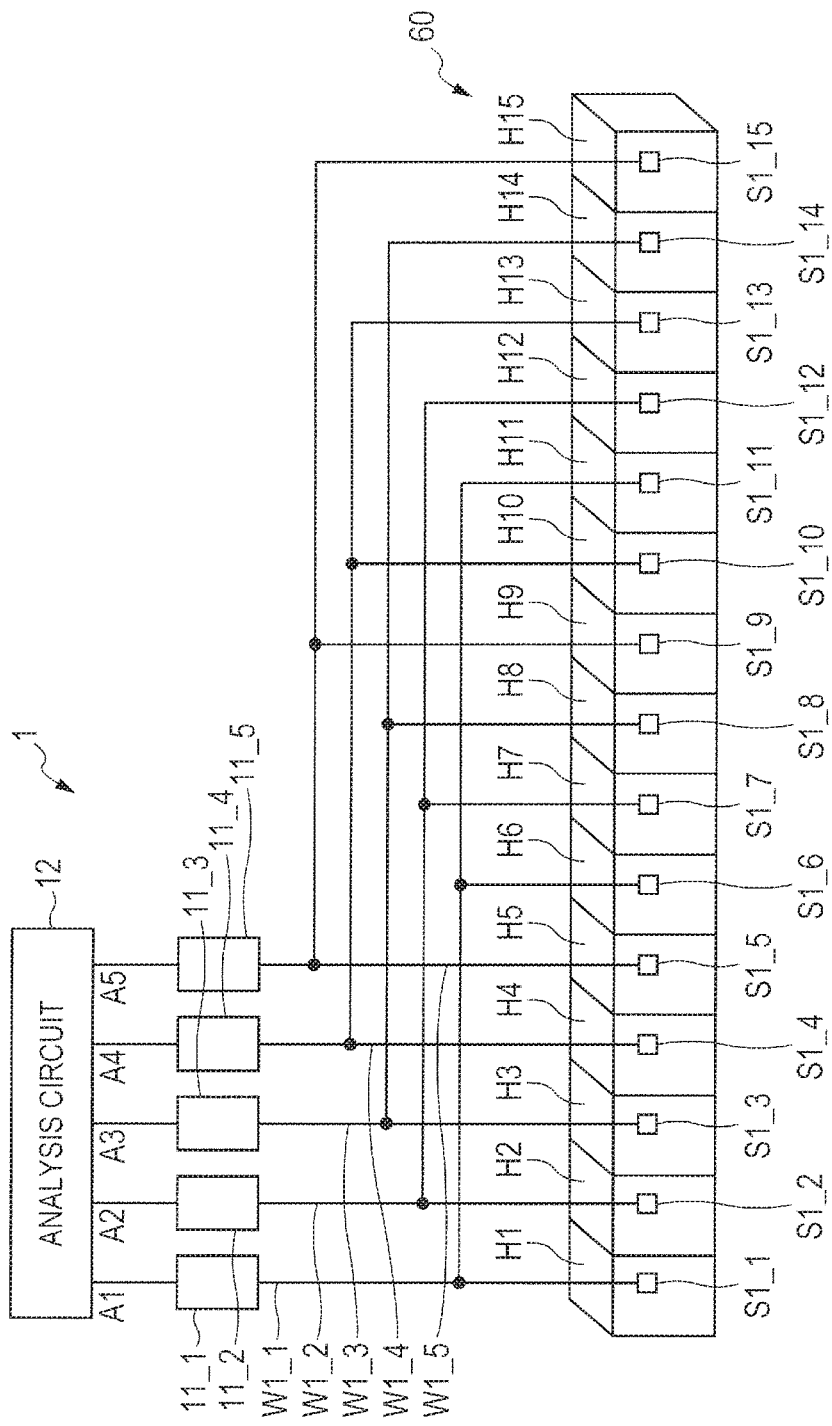
FIG. 7 is a diagram for showing an outline of a fire detection system SYS1 to which the semiconductor device 1 according to the first embodiment is applied.

FIG. 7 is a diagram for showing an outline of a fire detection system SYS1 to which the semiconductor device 1 is applied.

As shown in FIG. 7, the fire detection system SYS1 includes a building 60 having 15 houses H1 to H15 and a semiconductor device 1 used as a fire detection device.

The sensors S1_1 to S1_15 are installed in the 15 houses H1 to H15, respectively. For example, the detection signal having the strongest intensity is output by the sensor S1_6 installed in the house H6 where a fire has occurred, the detection signal having the second strongest intensity is output by the sensors S1_5 and S1_7 installed in the houses H5 and H7, respectively, adjacent to the house H6, and the detection signal having the third strongest intensity is output by the sensors S1_4 and S1_8 installed in the houses H4 and H8, respectively, adjacent to the houses H5 and H7. No detection signals are output by the other remaining sensors (in other words, 0-level detection signals are output by the other remaining sensors). The other configurations and operations of the semiconductor device 1 have been described above, and thus will be omitted.

The fire detection system SYS1 can accurately detect a house where a fire has occurred in a short time while suppressing the circuit scale from increasing by using a small number of measurement circuits 11_1 to 11_5.

Second Embodiment

Figure 8:
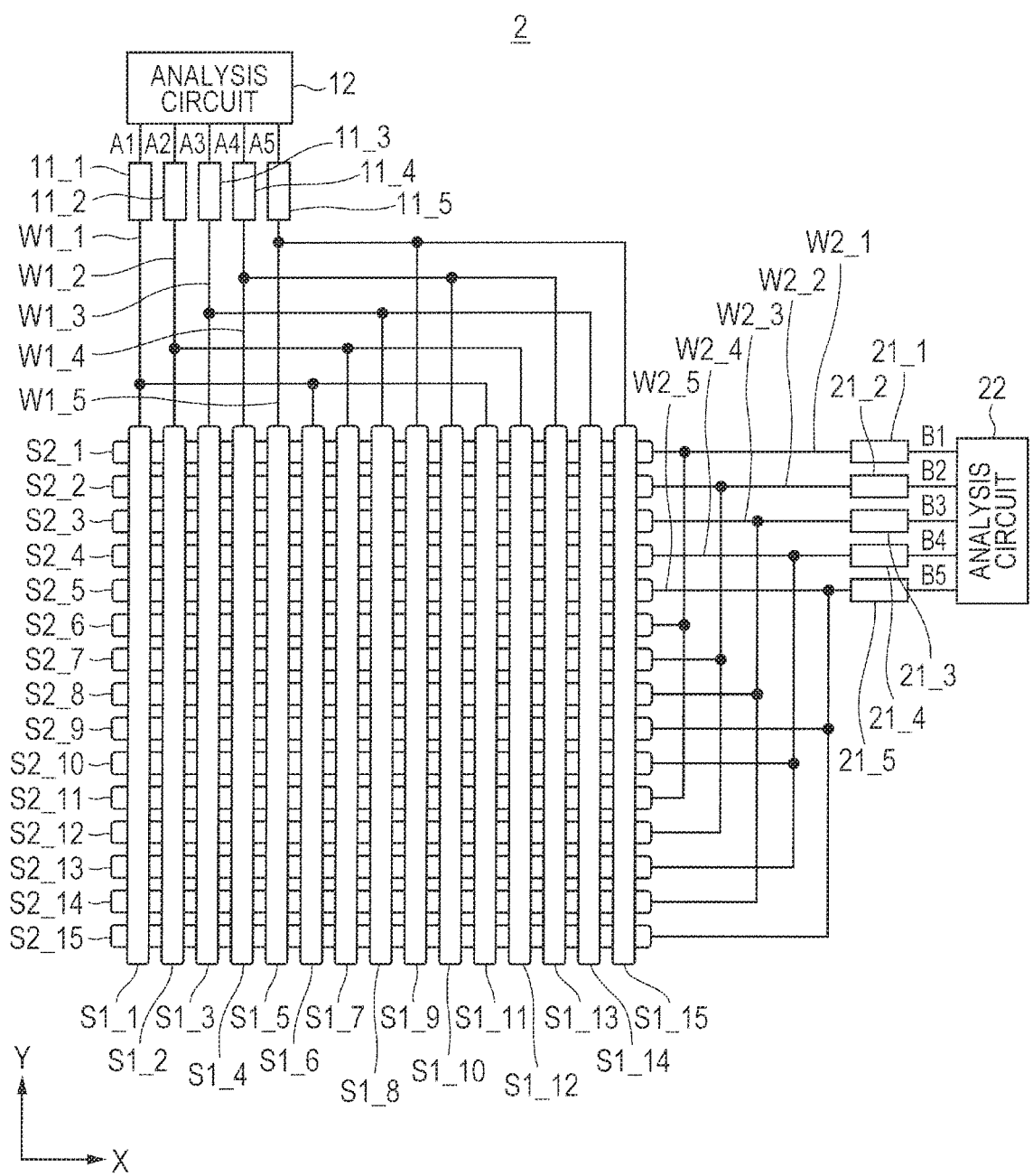
FIG. 8 is a block diagram for showing a configuration example of a semiconductor device according to a second embodiment.

FIG. 8 is a block diagram for showing a configuration example of a semiconductor device 2 according to a second embodiment. The semiconductor device 2 detects not only the position of a detection target T1 in the X-axis direction, but also the position of the detection target T1 in the Y-axis direction. Hereinafter, the semiconductor device 2 will be concretely described.

As shown in FIG. 8, the semiconductor device 2 includes sensors S2_1 to S2_15, measurement circuits 21_1 to 21_5, wires W2_1 to W2_5, and an analysis circuit 22 in addition to sensors S1_1 to S1_15, measurement circuits 11_1 to 11_5, wires W1_1 to W1_5, and an analysis circuit 12.

As similar to the case of the sensors S1_1 to S1_15, the sensors S2_1 to S2_15 are electrostatic capacitance-type sensors that change the value of an electrostatic capacitance when the detection target T1 comes close thereto, and output a detection signal having intensity in accordance with a distance up to the detection target T1. It should be noted that the sensors S1_1 to S1_15 are not limited to electrostatic capacitance-type sensors, but may be sensors that output detection signals having intensity in accordance with the intensity of light or piezoelectric sensors that output detection signals having intensity in accordance with applied pressures.

The sensors S1_1 to S1_15 are provided while extending in the Y-axis direction (for example, the column direction), and are arranged at predetermined intervals in the X-axis direction (for example, the row direction). The sensors S2_1 to S2_15 are provided while extending in the X-axis direction (for example, the row direction), and are arranged at predetermined intervals in the Y-axis direction (for example, the column direction). Namely, the sensors S1_1 to S1_15 and the sensors S2_1 to S2_15 are provided while being orthogonal to each other.

Accordingly, the semiconductor device 2 can detect the position of the detection target T1 in the X-axis direction using the sensors S1_1 to S1_15, and can detect the position of the detection target T1 in the Y-axis direction using the sensors S2_1 to S2_15.

A setting method of the coupling relations among the sensors S2_1 to S2_15 and the measurement circuits 21_1 to 21_5 is the same as that of the coupling relations among the sensors S1_1 to S1_15 and the measurement circuits 11_1 to 11_5.

As an example, the sensors S2_1 to S2_5 are coupled to the wires W2_1 to W2_5, respectively. The sensors S2_6 to S2_10 are coupled to the wires W2_1, W2_2, W2_3, W2_5, and W2_4, respectively. In addition, the sensors S2_11 to S2_15 are coupled to the wires W2_1, W2_2, W2_4, W2_3, and W2_5, respectively.

The measurement circuit 21_1 measures the added value of the detection signals of the sensors S2_1, S2_6, and S2_11 supplied to the wire W2_1, and outputs a measurement result B1. The measurement circuit 21_2 measures the added value of the detection signals of the sensors S2_2, S2_7, and S2_12 supplied to the wire W2_2, and outputs a measurement result B2. The measurement circuit 21_3 measures the added value of the detection signals of the sensors S2_3, S2_8, and S2_14 supplied to the wire W2_3, and outputs a measurement result B3. The measurement circuit 21_4 measures the added value of the detection signals of the sensors S2_4, S2_10, and S2_13 supplied to the wire W2_4, and outputs a measurement result 4. The measurement circuit 21_5 measures the added value of the detection signals of the sensors S2_5, S2_9, and S2_15 supplied to the wire W2_5, and outputs a measurement result B5. The configuration of each of the measurement circuits 21_1 to 21_5 is the same as the case of the measurement circuits 11_1 to 11_5, and thus the explanation thereof will be omitted.

The analysis circuit 22 is, for example, a microcomputer, and analyzes the position of the detection target T1 in the Y-axis direction on the basis of a combination of the measurement results B1 to B5 by the measurement circuits 21_1 to 21_5.

For example, in the case where the detection target T1 is positioned directly above the sensor S2_6, the combination of the measurement results B1 to B5 is "3, 2, 1, 1, 2". On the contrary, in the case where the detection target T1 is positioned directly above the sensor S2_11, the combination of the measurement results B1 to B5 is "3, 2, 0, 3, 1".

Namely, unlike the case of the semiconductor device 50, for example, the combination of the measurement results B1 to B5 in the case where the detection target T1 is positioned directly above the sensor S2_6 is different from that in the case where the detection target T1 is positioned directly above the sensor S2_11 in the configuration of the semiconductor device 2. All the combinations, including the above, of the measurement results B1 to B5 in accordance with the position of the detection target T1 are different from each other.

The other configurations and operations of the semiconductor device 2 are the same as the case of the semiconductor device 1, and thus the explanation thereof will be omitted.

As described above, as similar to the case of the semiconductor device 1, the semiconductor device 2 can accurately detect the position of the detection target T1 in a short time while suppressing the circuit scale from the increasing. In particular, the semiconductor device 2 can detect not only the position of the detection target T1 in the X-axis direction, but also the position of the detection target T1 in the Y-axis direction.

Third Embodiment

Figure 9:
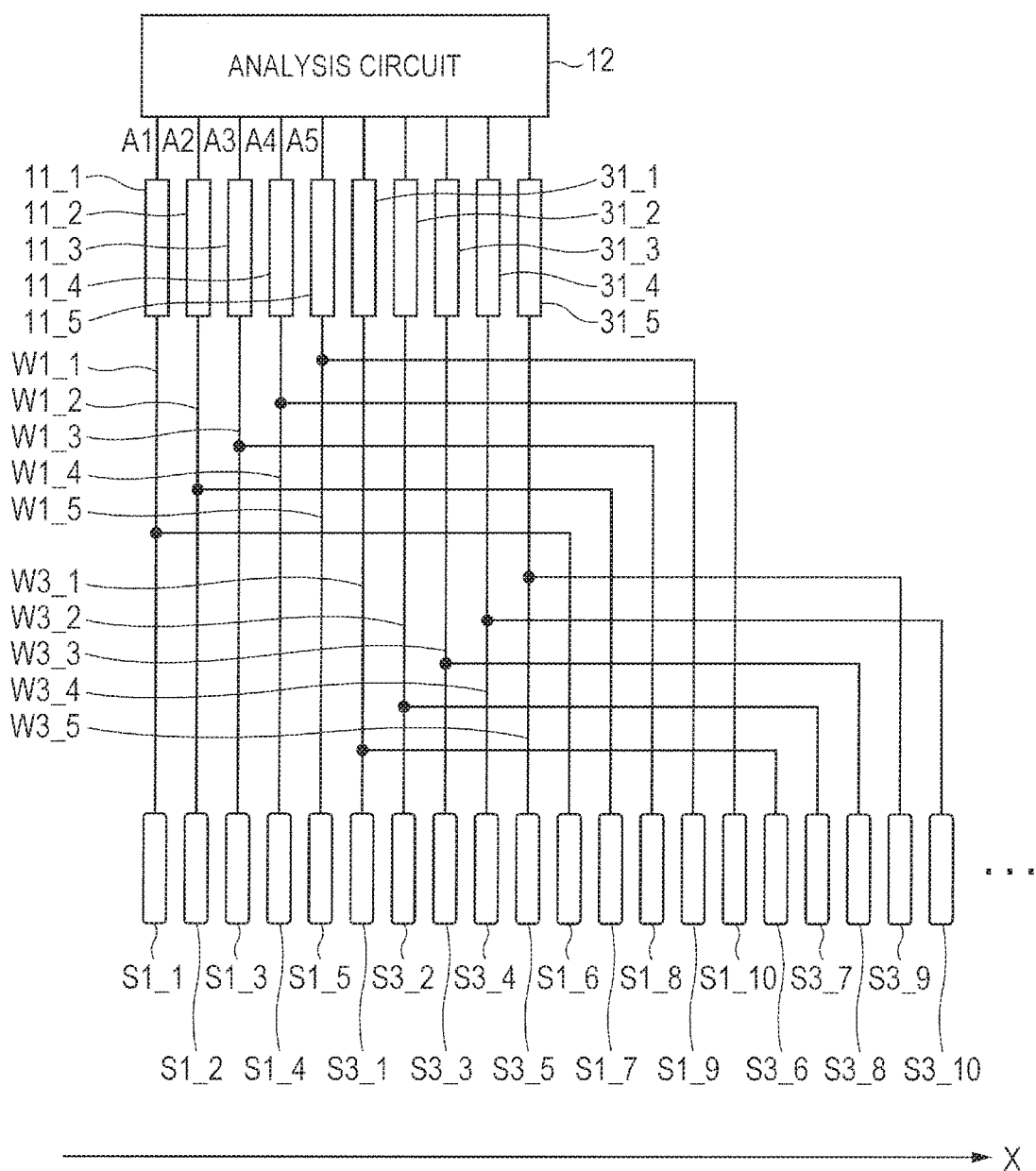
FIG. 9 is a block diagram for showing a configuration example of a semiconductor device according to a third embodiment.

FIG. 9 is a diagram for showing a configuration example of a semiconductor device 3 according to a third embodiment. As compared to the case of the semiconductor device 1, the semiconductor device 3 further includes sensors S3_1 to S3_15 and measurement circuits 31_1 to 31_5 corresponding to the sensors S1_1 to S1_15 and the measurement circuits 11_1 to 11_5.

The configuration of each of the sensors S3_1 to S3_15 and the measurement circuits 31_1 to 31_5 is the same as the case of the sensors S1_1 to S1_15 and the measurement circuits 11_1 to 11_5, and thus the explanation thereof will be omitted. In addition, a setting method of the coupling relations among the sensors S3_1 to S3_15 and the measurement circuits 31_1 to 31_5 is the same as that of the coupling relations among the sensors S1_1 to S1_15 and the measurement circuits 11_1 to 11_5, and thus the explanation thereof will be omitted.

Here, the sensors S1_1 to S1_15 and the sensors S3_1 to S3_15 are alternately arranged along the X-axis direction by each sensor group having five sensors. Accordingly, the semiconductor device 3 can easily make all the combinations of the measurement results A1 to A5 in accordance with the position of the detection target T1 different from each other as compared to the case of the semiconductor device 1.

As described above, in the semiconductor devices 1 to 3 according to the first to third embodiments, the coupling relations among the sensors S1_1 to S1_15 and the measurement circuits 11_1 to 11_5 are set so that all the combinations of the measurement results A1 to A5 (B1 to B5) in accordance with the position of the detection target T1 differ from each other. Accordingly, each of the semiconductor devices 1 to 3 according to the first to third embodiments can accurately detect the position of the detection target T1 in a short time without increasing the circuit scale. In addition, an increase in power consumption can be accordingly suppressed.

The invention achieved by the inventors has been concretely described above on the basis of the embodiments. However, it is obvious that the present invention is not limited to the above-described embodiments, and can be variously changed without departing from the scope thereof.

In each of the first to third embodiments, for example, a case in which the coupling relations among the sensors S1_1 to S1_15 and the measurement circuits 11_1 to 11_5 are set so that all the combinations of the measurement results A1 to A5 in accordance with the position of the detection target T1 differ from each other has been described, but the present invention is not limited to this. It is possible to improve the accuracy of detecting the position of the detection target T1 only by reducing the number of duplicated combinations among all the combinations of the measurement results A1 to A5 in accordance with the position of the detection target T1 as compared to a case in which no countermeasures are taken.

What is claimed is:

1. A semiconductor device comprising:
   first sensors that are arranged at predetermined intervals, the first sensors outputting first detection signals, respectively;
   a first measurement circuit that 1) measures an added value of two or more first detection signals among the first detection signals output from all of the first sensors and 2) outputs a first measurement result;
   a second measurement circuit that 1) measures an added value of two or more first detection signals that are different from the two or more first detection signals used by the first measurement circuit and 2) outputs a second measurement result; and
   an analysis circuit that analyzes a position of a detection target based on the first and second measurement results,
   wherein the first sensors and the first and second measurement circuits are coupled to each other so that combinations of the first and second measurement results differ from each other depending on the position of the detection target,
   wherein the first sensors and the first and second measurement circuits are coupled to each other in 1) a first coupling pattern or 2) a second coupling pattern different from the first coupling pattern, and
   wherein one of the first coupling pattern and the second coupling pattern having a larger difference between measurement results among all the combinations of the first and second measurement results is selected.

2. The semiconductor device according to claim 1, further comprising a third measurement circuit that measures an added value of two or more first detection signals that are different from those measured by the first and second measurement circuits among the first detection signals and outputs a third measurement result,
   wherein the analysis circuit is configured to analyze the position of the detection target based on the third measurement result in addition to the first and second measurement results, and
   wherein the first sensors and the first to third measurement circuits are coupled to each other so that combinations of the first to third measurement results differ from each other depending on the position of the detection target.

3. The semiconductor device according to claim 1, wherein two or more first sensors among the first sensors are configured to output the first detection signals having intensity in accordance with the position of the detection target.

4. The semiconductor device according to claim 3, wherein a first sensor that is closest to the detection target among the first sensors is configured to output a first detection signal having intensity stronger than that of a first sensor that is second closest to the detection target among the first sensors.

5. The semiconductor device according to claim 3,
wherein a first sensor that is closest to the detection target among the first sensors is configured to Output a first detection signal having a strongest intensity among the first sensors,
wherein a first sensor that is second closest to the detection target among the first sensors is configured to output a first detection signal having intensity weaker than that of the first sensor that is closest to the detection target, and
wherein a first sensor that is third closest to the detection target among the first sensors is configured to output a first detection signal having intensity weaker than that of the first sensor that is second closest to the detection target.

6. The semiconductor device according to claim 1, further comprising:
second sensors that are provided while extending in a row direction and are arranged at predetermined intervals in a column direction, the second sensors outputting second detection signals respectively;
a third measurement circuit that 1) measures an added value of two or more second detection signals among the second detection signals output from all of the second sensors and 2) outputs a third measurement result;
a fourth measurement circuit that measures an added value of two or more second detection signals that are different from the two or more second detection signals used by the third measurement circuit; and
a second analysis circuit that analyzes the position of the detection target in the column direction based on the third and fourth measurement results,
wherein the first sensors are 1) provided while extending in the column direction so as to be orthogonal to the second sensors and 2) arranged at predetermined intervals in the row direction,
wherein the first sensors and the first and second measurement circuits are coupled to each other so that combinations of the first and second measurement results differ from each other depending on the position of the detection target in the row direction, and
wherein the second sensors and the third and fourth measurement circuits are coupled to each other so that combinations of the third and fourth measurement results differ from each other depending on the position of the detection target in the column direction.

7. The semiconductor device according to claim 6,
wherein two or more first sensors among the first sensors are configured to output a first detection signal having intensity in accordance with the position of the detection target in the row direction, and
wherein two or more second sensors among the second sensors are configured to output a second detection signal having intensity in accordance with the position of the detection target in the column direction.

8. The semiconductor device according to claim 7,
wherein a first sensor that is closest to the detection target among the two or more first sensors is configured to output a first detection signal having intensity stronger than that of a first sensor that is second closest to the detection target among the two or more first sensors, and wherein a second sensor that is closest to the detection target among the two or more second sensors is configured to output a second detection signal having intensity stronger than that of a second sensor that is second closest to the detection target among the two or more second sensors.

9. The semiconductor device according to claim 7,
wherein a first sensor that is closest to the detection target among the two or more first sensors is configured to output a first detection signal having a strongest intensity among the two or more first sensors,
wherein a first sensor that is second closest to the detection target among the two or more first sensors is configured to output a first detection signal having intensity weaker than that of the first sensor that is closest to the detection target,
wherein a first sensor that is third closest to the detection target among the two or more first sensors is configured to output a first detection signal having intensity weaker than that of the first sensor that is second closest to the detection target,
wherein a second sensor that is closest to the detection target among the two or more second sensors is configured to output a second detection signal having a strongest intensity among the two or more second sensors,
wherein a second sensor that is second closest to the detection target among the two or more second sensors is configured to output a second detection signal having intensity weaker than that of the second sensor that is closest to the detection target, and
wherein a second sensor that is third closest to the detection target among the two or more second sensors is configured to output a second detection signal having intensity weaker than that of the second sensor that is second closest to the detection target.

10. The semiconductor device according to claim 6,
wherein the first sensors and the first and second measurement circuits are coupled to each other in 1) the first coupling pattern in which the first sensors and the first and second measurement circuits are coupled to each other so that combinations of the first and second measurement results differ from each other depending on the position of the detection target in the row direction or 2) the second coupling pattern that is different from the first coupling pattern,
wherein one of the first coupling pattern and the second coupling pattern having a larger difference between measurement results among all the combinations of the first and second measurement results is selected,
wherein the second sensors and the third and fourth measurement circuits are coupled to each other so that combinations of the third and fourth measurement results differ from each other depending on the position of the detection target in the column direction,
wherein the second sensors and the third and fourth measurement circuits are coupled to each other in 1) a third coupling pattern or 2) a fourth coupling pattern that is different from the third coupling pattern, and
wherein one of the third coupling pattern and the fourth coupling pattern having a larger difference between measurement results among all the combinations of the third and fourth measurement results is selected.

11. The semiconductor device according to claim 1,
wherein two or more first sensors are grouped as a first sensor group based on a number corresponding to measurement circuits including the first and second measurement circuits, and
wherein the two or more first sensors in the first sensor group are respectively coupled to the measurement circuits.

12. The semiconductor device according to claim 1, further comprising:
second sensors that are arranged at predetermined intervals together with the first sensors, the second sensors outputting second detection signals, respectively;
a third measurement circuit that 1) measures an added value of two or more second detection signals among the second detection signals output from all the second sensors and 2) outputs a third measurement result; and
fourth measurement circuit that 1) measures an added value of two or more second detection signals that are different from the two or more second detection signals used by the third measurement circuit and 2) outputs a fourth measurement result,
wherein the analysis circuit is configured to analyze the position of the detection target based on the third and fourth measurement results in addition to the first and second measurement results,
wherein the second sensors and the third and fourth measurement circuits are coupled to each other so that combinations of the third and fourth measurement results differ from each other depending on the position of the detection target,
wherein two or more first sensors are grouped as a first sensor group based on a number corresponding to measurements circuits including the first and second measurement circuits,
wherein two or more second sensors are grouped as a second sensor group based on a number corresponding to measurements circuits including the third and fourth measurement circuits,
wherein the two or more first sensors in the first sensor group are respectively coupled to measurements circuits that are different from each other among the measurement circuits including the first and second measurement circuits,
wherein the two or more second sensors in the second sensor group are respectively coupled to measurements circuits that are different from each other among the measurement circuits including the third and fourth measurement circuits, and
wherein the first sensor group and the second sensor are alternately arranged.

13. A control method of a semiconductor device comprising:
setting coupling relations among sensors arranged at predetermined intervals, a first measurement circuit, and a second measurement circuit;
detecting a detection target using each of the sensors;
measuring, using the first measurement circuit, an added value of two or more detection signals among detection signals output from all the sensors;
measuring, using the second measurement circuit, an added value of two or more detection signals that are different from the two or more detection signals used by the first measurement circuit; and analyzing a position of the detection target based on a first measurement result by the first measurement circuit and a second measurement result by the second measurement circuit,
wherein in setting the coupling relations, the sensors and the first and second measurement circuits are coupled to each other so that combinations of the first and second measurement results differ from each other depending on the position of the detection target,
wherein the sensors and the first and second measurement circuits are coupled to each other in 1) a first coupling pattern or 2) a second coupling pattern different from the first coupling pattern, and
selecting one of the first coupling pattern and the second coupling pattern having a larger difference between measurement results among all the combinations of the first and second measurement results.

14. The control method of the semiconductor device according to claim 13, further comprising measuring, using a third measurement circuit, an added value of two or more detection signals that are different from the two or more detection signals used by the first and second measurement circuits,
wherein in analyzing the position of the detection target, the position of the detection target is analyzed based on a third measurement result by the third measurement circuit in addition to the first and second measurement results, and
wherein in setting the coupling relations, the sensors and the first to third measurement circuits are coupled to each other so that combinations of the first to third measurement results differ from each other depending on the position of the detection target.

15. The control method of the semiconductor device according to claim 13, wherein two or more sensors among the sensors output two or more detection signals having intensity in accordance with the position of the detection target.

16. The control method of the semiconductor device according to claim 15, wherein a sensor that is closest to the detection target among the sensors outputs a detection signal having intensity stronger than that of a sensor that is second closest to the detection target among the sensors.

17. The control method of the semiconductor device according to claim 15,
wherein a sensor that is closest to the detection target among the sensors outputs a detection signal having a strongest intensity among the sensors,
wherein a sensor that is second closest to the detection target among the sensors outputs a detection signal having intensity weaker than that of the sensor that is closest to the detection target, and
wherein a sensor that is third closest to the detection target among the sensors outputs a detection signal having intensity weaker than that of the sensor that is second closest to the detection target.

18. A non-transitory computer readable media storing a program, which when executed by a computer having a semiconductor device comprising:
sensors that are arranged at predetermined intervals, the sensors outputting detection signals, respectively;
a first measurement circuit that 1) measures an added value of two or more detection signals among the detection signals output from all the sensors and 2) outputs a first measurement result;
a second measurement circuit that 1) measures an added value of two or more detection signals that are different from the two or more detection signals used by the first measurement circuit and 2) outputs a second measurement result; and an analysis circuit that analyzes a position of a detection target based on the first and second measurement results, causes the computer to execute processes of:

extracting information of a coupling pattern in which the sensors and the first and second measurement circuits are coupled to each other so that combinations of the first and second measurement results differ from each other depending on the position of the detection target; and setting coupling relations among the sensors and the first and second measurement circuits based on the extracted information of the coupling pattern, wherein the sensors and the first and second measurement circuits are coupled to each other in 1) a first coupling pattern or 2) a second coupling pattern different from the first coupling pattern, and selecting one of the first coupling pattern and the second coupling pattern having a larger difference between measurement results among all the combinations of the first and second measurement results.

* * * * *